(12) United States Patent
Gorenstein

(10) Patent No.: US 10,713,639 B2
(45) Date of Patent: Jul. 14, 2020

(54) SYSTEMS AND METHODS FOR USE IN EXPANDING ACCOUNT SERVICES

(71) Applicant: MASTERCARD INTERNATIONAL INCORPORATED, Purchase, NY (US)

(72) Inventor: Alan Gorenstein, Fairfield, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 710 days.

(21) Appl. No.: 15/226,156

(22) Filed: Aug. 2, 2016

(65) Prior Publication Data
US 2018/0039970 A1 Feb. 8, 2018

(51) Int. Cl.
*G06Q 20/28* (2012.01)
*G06Q 20/40* (2012.01)
*G06Q 20/34* (2012.01)

(52) U.S. Cl.
CPC .......... *G06Q 20/28* (2013.01); *G06Q 20/349* (2013.01); *G06Q 20/409* (2013.01); *G06Q 20/4016* (2013.01)

(58) Field of Classification Search
CPC ..................................................... G06Q 20/28
USPC ............................................................ 705/44
See application file for complete search history.

(56) References Cited

U.S. PATENT DOCUMENTS

| | | | | |
|---|---|---|---|---|
| 7,386,507 B2 * | 6/2008 | Davis | ................... | G06Q 20/102 705/35 |
| 8,799,150 B2 * | 8/2014 | Annappindi | ........... | G06Q 40/02 705/322 |
| 2007/0267479 A1 * | 11/2007 | Nix | ........................ | G06Q 20/10 235/379 |
| 2007/0271178 A1 * | 11/2007 | Davis | .................... | G06Q 40/02 705/38 |
| 2009/0164363 A1 * | 6/2009 | Ahlers | ................... | G06Q 20/10 705/38 |
| 2009/0254443 A1 * | 10/2009 | Ahlers | ................... | G06Q 20/10 705/17 |
| 2012/0054088 A1 * | 3/2012 | Edrington | ............ | G06Q 40/025 705/38 |
| 2012/0191596 A1 * | 7/2012 | Kremen | ................. | G06Q 40/02 705/38 |

(Continued)

OTHER PUBLICATIONS

"Consumer Borrowing after Payday Loan Bans" Bhutta, Goldin and Tatiana (Year: 2016).*

*Primary Examiner* — Bruce I Ebersman
(74) *Attorney, Agent, or Firm* — Harness, Dickey & Pierce, P.L.C.

(57) ABSTRACT

Disclosed are exemplary embodiments of systems and methods for use in extending credit services to prepaid payment accounts, based on anticipated load transaction thereto. In an exemplary embodiment, a method generally includes receiving an advance request, from a user, for a prepaid account. The prepaid account is associated with anticipated load transactions associated with the user to which the prepaid account is associated. The advance request also includes an advance amount. The exemplary method also includes determining whether to approve the advance request based on the anticipated load transaction and at least one metric associated with user, and causing the prepaid account to reflect the advance amount when the advance request is approved.

15 Claims, 3 Drawing Sheets

(56) References Cited

U.S. PATENT DOCUMENTS

2016/0086261 A1\* 3/2016 Shah .................. G06Q 40/025
 705/38

\* cited by examiner

SYSTEMS AND METHODS FOR USE IN EXPANDING ACCOUNT SERVICES

FIELD

The present disclosure generally relates to systems and methods for use in expanding account services, and in particular, to systems and methods for use in extending credit account services to prepaid payment accounts based on anticipated load transactions to the prepaid payment accounts.

BACKGROUND

This section provides background information related to the present disclosure which is not necessarily prior art.

Payment accounts are known to be used to fund transactions for the purchase of products (e.g., goods, services, etc.). The payment accounts are generally provided by various issuers in three types, including credit, debit, and prepaid. Credit payment accounts are consumer specific accounts having associated credit lines. When consumers initiate purchase transactions, the credit lines are diminished and the transactions are funded by borrowing from the issuers of the accounts. The consumers later repay the amount to the issuers. Generally, spending is limited to the credit lines associated with the credit payment accounts. Debit payment accounts are linked to bank accounts (e.g., checking accounts, etc.), where funds are pulled from the accounts as purchases are made. Spending is generally limited to the existing funds in the accounts, however, overdraft protection is often available from the issuers of the accounts. Prepaid payment accounts are reloadable cards that allow consumers to only spend up to the amounts pre-deposited therewith. The prepaid payment accounts are often not consumer specific, and as such, do not have associated credit lines or overdraft protections.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Prepaid payment accounts may be used in a variety of manners. For example, employers may use such accounts as a means of paying wages, including salary and benefits, to its employees. In connection therewith, the prepaid accounts are disseminated to the employees, often in the form of prepaid cards, and the employers, for each pay period, initiate wage load transactions for such salary and/or benefits to the cards. In turn, the employees are able to directly spend funds loaded to the prepaid cards conveniently, and without having to interact, generally, with banks to cash checks or otherwise access the funds. If no funds are available, however, the employees (as consumers) are unable to purchases products with the prepaid cards. Uniquely, the systems and methods herein extend lines of credit (broadly, an account service) to prepaid payment accounts based on one or more metrics associated with the employees (as consumers). In particular, an employee consumer is able to request a line of credit, such as an "advance," a loan, etc., to be associated with his/her prepaid payment account. In turn, a risk engine compiles metrics associated with the employee, such as, for example, wage amount and trajectory, rates of termination by the corresponding employer, length of employment, historic use of the prepaid payment account, frequency of advances, etc. Based on the available metrics, the risk engine is able to define an available wage advance for the employee. If the employee utilizes the advance, the funds from the next load, by the employer, are automatically reduced/debited by the amount used of the advance (or by a defined schedule for such reductions/debits). In this manner, the employee is provided more flexibility in spending associated with the prepaid payment account, while exposing the issuer (or other entity) extending the advance to limited risk.

Figure 1:
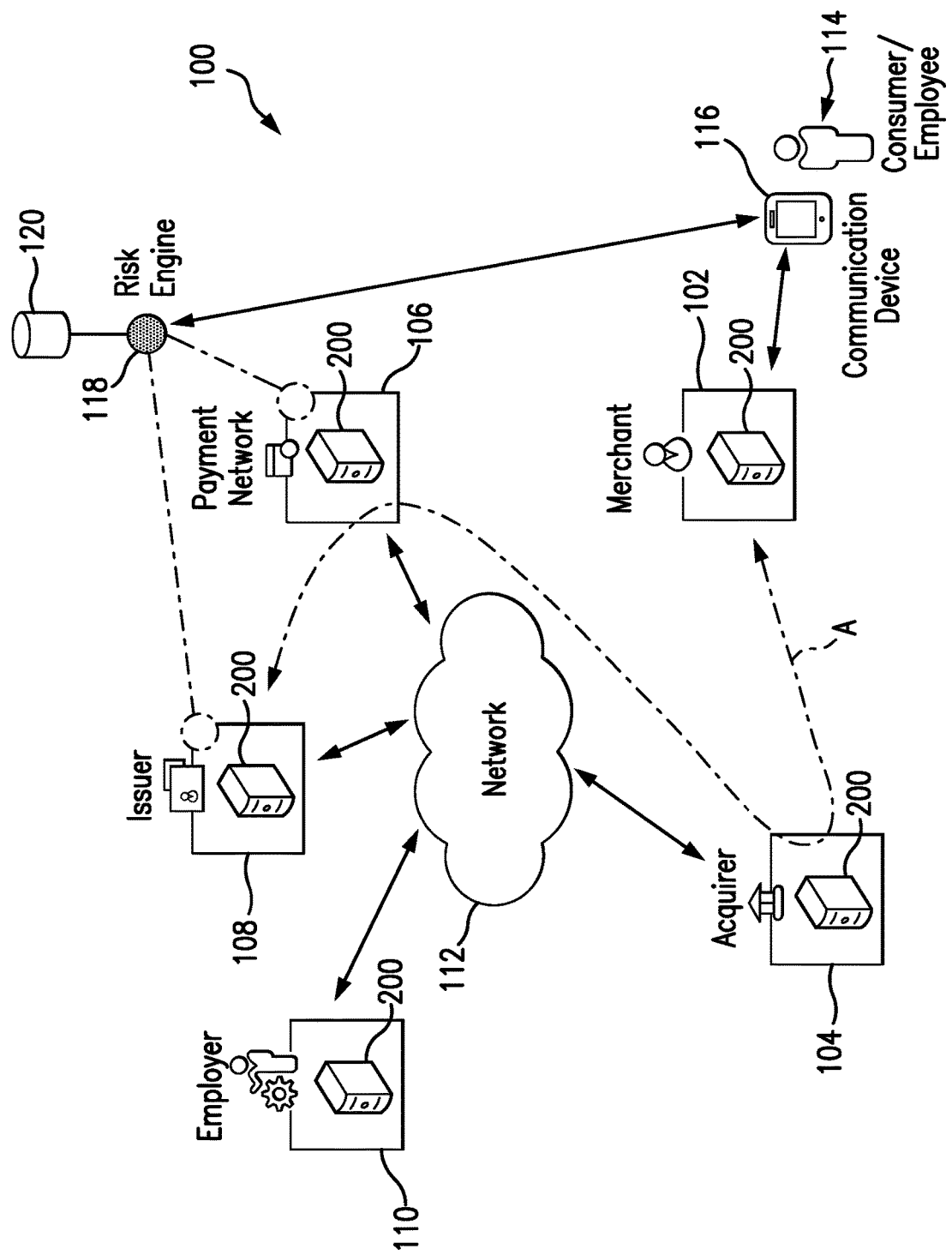
FIG. 1 is a block diagram of an exemplary system of the present disclosure suitable for use in extending credit services to prepaid payment accounts associated with consumers.

FIG. 1 illustrates an exemplary system 100, in which one or more aspects of the present disclosure may be implemented. Although, in the described embodiment, the system 100 is presented in one arrangement, other embodiments may include the system 100 arranged otherwise depending on, for example, arrangement of entities extending credit to prepaid payment accounts, etc.

As shown in FIG. 1, the system 100 generally includes a merchant 102, an acquirer 104, a payment network 106, an issuer 108, and an employer 110, each coupled to (and in communication with) network 112. The network 112 may include, without limitation, a wired and/or wireless network, a local area network (LAN), a wide area network (WAN) (e.g., the Internet, etc.), a mobile network, and/or another suitable public and/or private network capable of supporting communication among two or more of the illustrated parts of the system 100, or any combination thereof. In one example, the network 112 includes multiple networks, where different ones of the multiple networks are accessible to different ones of the illustrated parts in FIG. 1. In this example, the network 112 may include a private payment transaction network made accessible by the payment network 106 to the acquirer 104 and the issuer 108 and, separately, a public network (e.g., the Internet, etc.) through which the merchant 102 and the acquirer 104 may communicate (e.g., via a website or via network-based applications, etc.).

In the system 100, the employer 110 employs the consumer 114, which is also referred to herein as the employee. The employee 114 performs tasks consistent with his/her employment agreement for the employer 110, and in turn, the employer 110 pays the employee a wage (e.g., an hourly rate, a salary, a benefit, combinations thereof, etc.), which is paid out at one or more regular or irregular intervals. In this exemplary embodiment, the employer 110 coordinates with the issuer 108 to provide a prepaid payment account to each of the employer's employees, including the employee 114. Then, the employer 110 pays out the wages in the form of wage load transactions to the prepaid payment accounts identified to the employees, including the prepaid payment account identified to the employee 114. Such load transactions for wages, while the employees remain employed with the employer 110, may be understood to be anticipated load transactions. As the load transactions are posted to the prepaid payment accounts (and become available to fund transactions), the employees are able to purchase products (e.g., from the merchant 102, etc.) or otherwise spend the wages. In one example referred to herein as the John Smith example, the employee 114 (i.e., John Smith) per his/her agreement with the employer 110, is employed and is earning $15 per hour, and is paid $1200 every other Friday via a load transaction to his prepaid payment account.

Generally in the system 100, the merchant 102 offers products (e.g., goods, services, etc.) for sale to consumers, such as to the employee 114. Then, in connection with the employer 110 paying wages to the employee 114, once the funds are loaded to the employee's prepaid payment account, the employee 114, acting as a consumer, is able to purchase products, as desired, from the merchant 102.

In an example transaction, when the employee 114 (as a consumer) desires to make a purchase at the merchant 102, funded by the prepaid payment account, the employee 114 presents payment account information for the account (e.g., in the form of a prepaid card, or virtual wallet, etc.) to the merchant 102. The merchant 102 captures the payment account information, and causes an authorization request, for the transaction, to be transmitted to the acquirer 104, along path A in the system 100.

In turn, the acquirer 104 communicates the authorization request to the issuer 108 (associated with the employer prepaid account) along path A through the payment network 106, such as, for example, through MasterCard®, VISA®, Discover®, American Express®, etc. The issuer 108 employs a variety of rules and/or conditions to determine whether the consumer's payment account is in good standing and whether sufficient funds and/or credit exist to fund the transaction. If approved, an authorization reply is transmitted back from the issuer 108 to the merchant 102 along path A, thereby permitting the merchant 102 to complete the transaction. The transaction is later cleared and/or settled (via appropriate transaction messages such as clearing messages and/or settlement messages, for example) by and between the merchant 102, the acquirer 104, and the issuer 108 (by appropriate agreements). If the transaction is declined (e.g., for lack of funds in the prepaid payment account, etc.), an authorization reply is provided back to the merchant 102, thereby permitting the merchant 102 to halt or terminate the transaction, or request alternate funding.

Transaction data is generated, collected, and stored as part of the above interactions among the merchant 102, the acquirer 104, the payment network 106, the issuer 108, and the employee 114. The transaction data represents at least a plurality of transactions, for example, authorized transactions, cleared and/or settled transactions, attempted transactions, etc. The transaction data, in this exemplary embodiment, is stored at least by the payment network 106 (e.g., in a data structure associated with the payment network 106, etc.), but could be stored in other parts of the system 100. Additionally, or alternatively, transaction data may be transmitted among parts of the system 100 as desired and/or necessary. As used herein, transaction data may include, for example (and without limitation), primary account numbers (PANs) for accounts involved in the transactions, amounts of the transactions, merchant IDs for merchants involved in the transactions, merchant category codes (MCCs), dates/times of the transactions, location data associated with the transactions, etc. It should be appreciated that more or less information related to transactions, as part of either authorization or clearing and/or settling, may be included in transaction records (comprising transaction data) and stored within the system 100, at the merchant 102, the acquirer 104, the payment network 106 and/or the issuer 108, or elsewhere In various exemplary embodiments, consumers (e.g., employee 114, etc.) involved in the different transactions herein are prompted to agree to legal terms associated with their prepaid payment accounts, for example, during enrollment in their accounts, or while registering to submit requests for advances, as described below, etc. In so doing, the consumers may voluntarily agree, for example, to allow merchants, issuers, payment networks, risk engines, employers, etc., to use data collected during such enrollment/registration and/or collected in connection with processing the transactions herein, subsequently for one or more of the different purposes described herein.

It should be appreciated that a variety of different arrangements may exist between an employer and one or more employees, which result in wages being paid in the manner above. In addition, while described with reference to an employer-employee relationship, the present disclosure is not so limited. Rather, the present disclosure is applicable to various other arrangements, in which sources pay funds to users or recipients in load transactions to one or more prepaid payment accounts (e.g., in the form of annuities, structured settlements, etc.).

Figure 2:
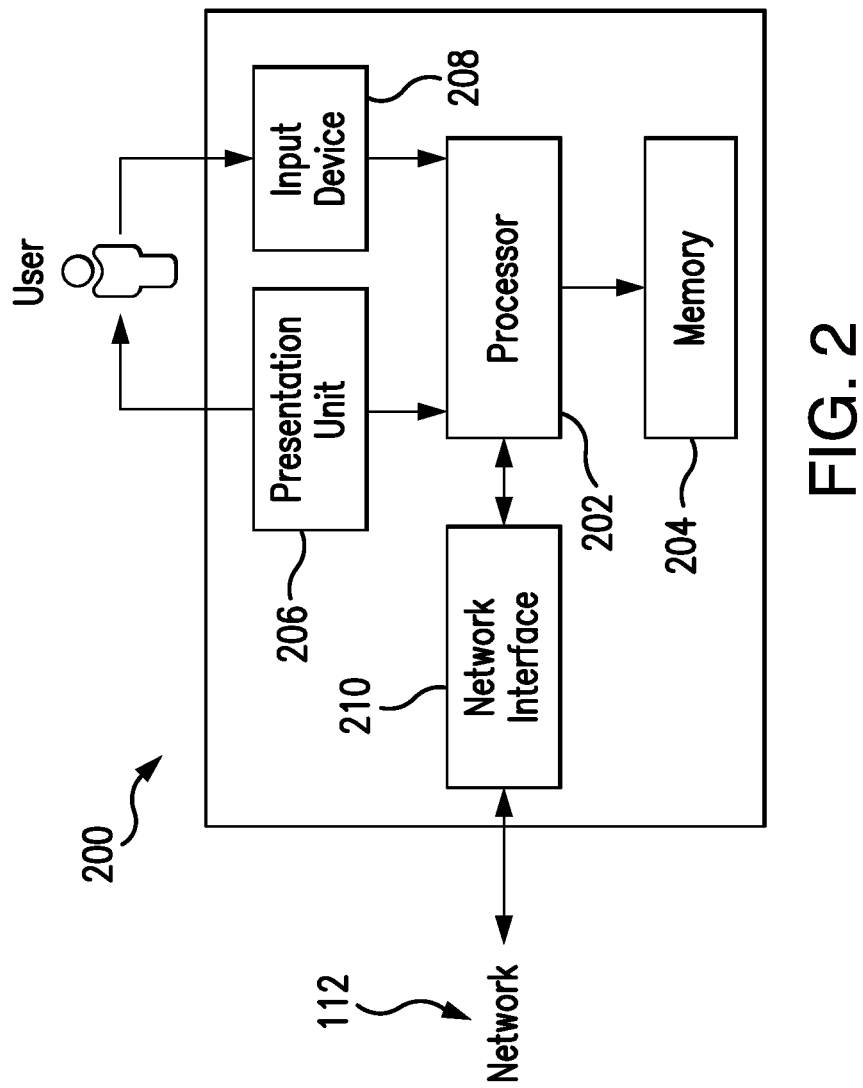
FIG. 2 is a block diagram of a computing device that may be used in the exemplary system of FIG. 1.

FIG. 2 illustrates an exemplary computing device 200 that can be used in the system 100 of FIG. 1. The computing device 200 may include, for example, one or more servers, workstations, routers, personal computers, tablets, laptops, smartphones, point-of-sale (POS) terminals, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, each of the merchant 102, the acquirer 104, the payment network 106, the issuer 108, and the employer 110 are illustrated as including, or being implemented in, computing device 200, coupled to (and in communication with) the network 112. In addition, communication device 116 associated with employee 114 should be understood to be consistent with the computing device 200. However, the system 100 (and the parts therein) should not be considered to be limited to the computing device 200, as described below, as different computing devices and/or arrangements of computing devices may be used. In addition, different components and/or arrangements of components may be used in other computing devices.

The exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, employee data, employer data, prepaid account ledgers, and/or other types of data and/or data structures suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in one or more of the functions or processes described herein.

In the exemplary embodiment, the computing device 200 includes a presentation unit 206, or output device, that is coupled to (and is in communication with) the processor 202. The presentation unit 206 outputs information, for example, visually, audibly, etc., to a user of the computing device 200, such as, for example, the employee 114, etc. It should be further appreciated that various interfaces (e.g., as defined by network-based applications, etc.) may be displayed at computing device 200, and in particular at presentation unit 206, to display such information. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

The computing device 200 also includes an input device 208 that receives inputs from the user (i.e., user inputs) such as, for example, submission of advance requests by the employee 114, etc. The input device 208 is coupled to (and is in communication with) the processor 202 and may include, for example, a keyboard, a pointing device, a mouse, a button, a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both a presentation unit and an input device.

In addition, the illustrated computing device 200 further includes a network interface 210 coupled to (and in communication with) the processor 202 and the memory 204. The network interface 210 may include, without limitation, a wired network adapter, a wireless network adapter, a mobile network adapter, or other device capable of communicating to/with one or more different networks, including the network 112. Further, in some exemplary embodiments, the computing device 200 includes the processor 202 and one or more network interfaces (including the network interface 210) incorporated into or with the processor 202.

Referring again to FIG. 1, as described above, the employee 114 is identified to a prepaid payment account, to which his/her wages are deposited by the employer 110 through wage load transactions. The employee 114 is then able to spend the funds from the prepaid payment account, as desired. From time to time, the employee 114 may be subject to one or more conditions and/or situations in which an advance on his/her wages would be useful and/or even necessary. In this exemplary embodiment, the employee's prepaid payment account (and the other prepaid payment accounts associated with the other employees of the employer 110) are eligible for wage advances, whereby the balance of the prepaid payment account may be permitted (or tolerated) to become "negative," and whereby a credit service (broadly, an account service) is extended to the employee 114 through the prepaid payment account. In connection with such negative balance, funds may be advanced to the employee 114 based on future wage advances (as will be described more hereinafter). This service may be extended to the employee 114 by one or more of the payment network 106, the issuer 108, or the employer 110, where any risk associated with the wage advance may be shouldered individually by one of these parts or may be shared. In addition, as used herein, a negative balance may literally show as a negative balance on a statement (or any associated accountings or ledgers) indicating a credit facility is attached to the prepaid payment account, or a negative balance may represent a load to the prepaid payment account by the issuer 108 or a third-party provider of the advance (distinguishing the advance, as a "negative," from other expected wage load transactions from the employer 110 that may be considered "positive").

Specifically, the system 100 includes a risk engine 118, which is configured, by executable instructions, to perform one or more operations described herein. For example, the risk engine 118 is configured to accommodate one or more requests, by employees of the employer 110 (including the employee 114) (broadly, users), for wage/pay advances from/by the employer 110 (broadly, a source). As shown, the risk engine 118 is a standalone computing device in the system 100 (e.g., consistent with computing device 200, etc.). As indicated by the dotted lines, however, the risk engine 118 may be incorporated or included, in whole or in part, in the payment network 106 and/or the issuer 108 (or even in other entities in FIG. 1, such as, for example, the employer 110, etc.). Further, it should be appreciated that, in some embodiments, the risk engine 118 may be provided by one or more service providers associated with the payment network 106, the issuer 108, or otherwise, but not shown in FIG. 1.

The system 100 further includes a data structure 120, which is coupled to the risk engine 118. The data structure 120 may be separate from the risk engine 118, as illustrated in FIG. 1, or may be incorporated and/or included therein in other system embodiments. The data structure 120 is generally stored in memory, such as, for example, the memory 204 of the computing device associated with the risk engine 118, etc. In this exemplary embodiment, the data structure 120 includes a variety of data, including, without limitation, data related to the employer 110 (e.g., business location, operating sites/office locations of the employer 110, rates of job loss (or termination) (e.g., per the employer 110, per operating site of the employer 110, etc.), a current employee list, termination procedures, etc.), data related to the employee 114 (e.g., employment history, current length of employment, one or more job loss rates (e.g., due to termination, voluntary departure, etc.), transaction history, wage load history, wage amount, wage trajectory (e.g., trends in the wage amount, etc.), number of wage advances requested and corresponding dates, etc.), data related to the association between the employer 110 and the employee 114 (e.g., employment term, wage amount, etc.), and any other suitable data relating thereto (e.g., average wages by region based on job type, job type and employment rates therefore, employee age, employee marital status, or other criteria, etc.), where each type of data may be current and/or historical, etc.

The data structure 120 may also include a risk model (or multiple risk models), which relate(s) data from the data structure 120 regarding the employer 110, the employee 114, and the association therebetween, etc. to a risk associated with extending credit to the employee 114, etc. Example models may include, without limitation, vendor-produced models relating to credit scores (e.g., the FICO Score model from Fair Isaac Corporation, etc.); models relating to bankruptcy scores (e.g., the FICO Bankruptcy Score model from Fair Isaac Corporation, etc.); internally produced bespoke models, combinations of multiple models that may exhibit themselves within scorecards, multivariate regressions, etc.

In the exemplary embodiment, when the employee 114 wishes to make a request for a wage advance of funds (or a request for a line of credit based on future wages), to be provided by the prepaid payment account, the employee 114 may submit the request to the risk engine 118, in one or more different forms. Specifically, for example, the communication device 116 associated with the employee 114 may include an application configured to be used to facilitate such request. In particular, the application (not shown) may uniquely configure the communication device 116 to interact with the risk engine 118 to submit the request for the wage advance thereto. As such, the application, when installed and active in the communication device 116, permits the employee 114 to identify his/her prepaid account, to provide personal information about himself/herself, to identify a wage advance (e.g., an advance amount, timing of the advance, etc.), to identify a category of merchant and/or reason(s) for the wage advance, to identify one or more repayment plans, and to submit the request for the wage advance to the risk engine 118. With that said, it should be appreciated that the request for the wage advance may include a variety of information, which may be solicited from the employee 114, by the application, or otherwise obtained from the employee 114 (e.g., in advance of the request (e.g., at registration by the employee 114 for the prepaid payment account, etc.), from the employer 110, etc.). It should also be appreciated that, apart from the above application potentially included at the employees communication device 116, the employee 114 may alternatively submit the request for the wage advance via a website, which is similar to the application, or via other interactions with the risk engine 118 including, for example, a telephone call, a short message services (SMS) message, a paper-based application/form submission, etc.

In turn, the risk engine 118 is configured to receive the request for the wage advance, from the employee 114, and to determine whether to approve or decline the request. To do so, the risk engine 118 is configured to access data from the data structure 120, including, without limitation, a variety of the data related to the employer 110, the employee 114, and/or the employee's prepaid payment account, etc. In addition, in at least one embodiment, the risk engine 118 is configured to capture credit score information for the employee 114 in connection with the decision to approve or decline the advance request, and/or at one or more regular or irregular intervals, etc. (e.g., as part of implementing one or more risk models, etc.). In one example, the risk engine 118 is configured to capture a credit score for the employee 114, in three month intervals. The most recently captured credit score, potentially along with trends in the employee's credit score over desired intervals, is/are then used, in this example, by the risk engine 118, to determine to grant or deny the advance request.

The risk engine 118 may then be configured to subject the above data, in whole or in part, to the risk model(s) (or to one or more other data models, or to combine the data and one or more such models and expose them to a further model, regression, scorecard, etc.) in the data structure 120, and determine if one or more corresponding thresholds are satisfied. Based thereon, the risk engine 118 is configured to ultimately determine whether to approve or decline the employee's request for the advance. The thresholds may be defined by, or for, the issuer 108 associated with the prepaid payment account, and may be based on, for example (and without limitation) the amount of the wage advance requested, the proposed repayment scheme, other factors relating to the wage advance, combinations thereof, etc.

In at least one embodiment, the risk engine 118 is configured, in determining whether to approve or decline the advance, to request a credit score for the employee 114 and/or transmit the request for the wage advance to a service provider (not shown) (e.g., TSYS® company, etc.), which determines whether the data related to the employer 110, the employee 114, and/or the employee's prepaid account satisfies one or more thresholds associated therewith. The service provider, then, is configured to return an indication to the risk engine 118 that is either positive or negative regarding the request. In turn, the risk engine 118 is configured to rely on the indication to determine whether to approve or decline the request for the wage advance.

In the illustrated embodiment, if the output of the risk model(s) fails to satisfy the particular threshold associated therewith, the risk engine 118 is configured to decline the request for the advance (whereby the employee 114 is not permitted to spend more than is included in the prepaid account). In addition, the risk engine 118 is configured to transmit a notification to the employee 114 indicating the decline. In other embodiments, if the threshold is not satisfied, the issuer 108 may opt to sell the wage advance opportunity to a third-party provider that will then shoulder any risk associated with the wage advance. If no such third-party provider is available, the request for the wage advance is declined. Or, potentially, the risk engine 118 (or the issuer 108) may offer an alternative wage advance having a lower amount with a potentially different repayment plan (and thereby having a different threshold).

Conversely, if the employee's request for the advance is approved (i.e., the output of the risk model(s) satisfies the threshold associated therewith), the wage advance is approved and the risk engine 118 is configured to transmit a notification of the advance being approved to the employee 114. The risk engine 118 is also configured to cause the issuer 108 (e.g., via notification and/or instruction, etc.) to tolerate and/or permit a negative balance for the prepaid payment account for the employee 114 for at least a predefined amount (as requested), payment plan (as requested), and interval (e.g., three days, four days, ten days, a pay cycle, 30 days, etc.), thereby extending credit service to the employee 114 via the prepaid payment account. Subsequently, the risk engine 118 is configured to tabulate a ledger amount, which may include, for example, the negative balance of the prepaid payment account and one or more fees associated with the negative balance including, for example, exchange interest amounts, service fees, exchange fees, etc., for a defined interval. Then, the risk engine 118 is configured to detect when the negative balance of the prepaid account is erased (e.g., substantially immediately after a next one of the wage load transactions from the employer 110 is available in the prepaid payment account, etc.), and to cause a portion of a ledger amount (e.g., as defined by a repayment plan by the employee 114 or employer 110, etc.) (or the entire ledger amount) to be debited from the prepaid payment account (to pay back the advance).

In some embodiments, a multivariate regression, scorecard, etc. may be used to combine different methods/models/factors of predicting probability-of-default by the employee 114, exposure at default, etc. In connection therewith, particular weightings may be placed on various ones of the different methods/models/factors to produce a score forecasting likelihood of default and/or exposure at default, given a requested amount for a wage advance and a proposed repayment scheme. As an example, in connection with a request for a wage advance of $1,000 by the employee 114 from the issuer 108, the risk engine 118 may employ a scorecard that sums the FICO score for the employee 114, current outstanding wage advances the employee 114 has with the issuer 108, and length of employment of the employee 114 with the employer 110. In connection therewith, the FICO score and the length of employment for the employee 114 may both be weighted at 25%, while the employee's current outstanding wage advances with the issuer 108 may be weighted at 50%. Based on this scorecard, if the employee 114 has a FICO score of 700, has been employed with the employer 110 for 60 months, and has an outstanding wage advance amount of $200 with the issuer 108, then his/her resulting score may be 90 (i.e., (0.25*700)+(60*0.25)−(200*0.50)). In this example, if the threshold score is 100 (based on the $1,000 amount of the wage advance), the score for the employee 114 would fail to satisfy the threshold. And, the issuer 108 may either decline the request for the wage advance, or propose an alternative wage advance amount that is associated with a lower threshold.

Figure 3:
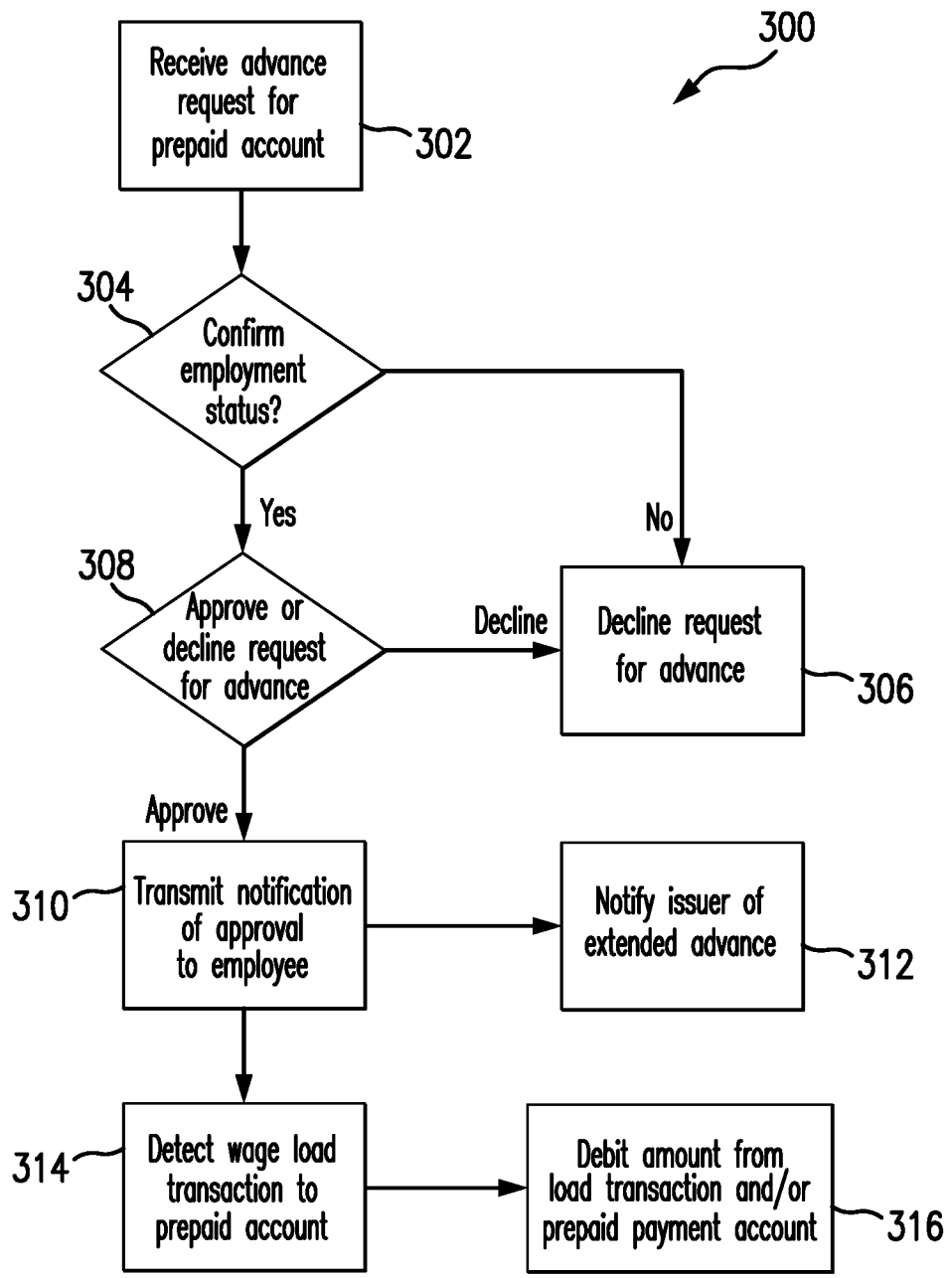
FIG. 3 is an exemplary method, which is suitable to be implemented in the system of FIG. 1, and which may be used to extend a credit service to a prepaid payment account associated with a consumer.

FIG. 3 illustrates an exemplary method 300 for use in extending a credit service (e.g., a wage advance, etc.) to a prepaid payment account associated with a consumer. The method 300 is described with reference to the system 100, and in particular to the risk engine 118, and further with reference to the computing device 200. The methods described herein (including the method 300), however, should not be considered to be limited to the system 100, or the computing device 200. Likewise, the systems and devices herein should not be considered to be limited to the method 300.

Initially, the employee 114 submits a request for a wage advance to his/her prepaid payment account. As explained above, the request may be submitted via a network-based application installed and/or active in the communication device 116 or in another device, or via a website, telephone call, SMS message, or otherwise, etc. The request for the advance generally includes an amount of the advance and an identification of the employer 110, the employee 114, and/or the prepaid payment account. The request may further include a time interval over which the advance is needed, a repayment plan (e.g., a number of payments, a percentage to be repaid per payment, etc.), a reason for the advance, a category of merchant at which the advance will be used, etc. In at least one embodiment, the employee 114 is also required to include personal information such as, for example, social security number and contact information in the request. In other embodiments, at least some or all of the employee's personal information may be already known to the risk engine 118 (e.g., already stored in the data structure 120, etc.), for example, through a registration process associated with installing the application at the communication device 116, via registration of the employee 110 in connection with providing the prepaid payment account to the employee 114, or otherwise.

In the John Smith example discussed above, Mr. Smith's refrigerator broke, resulting in an unexpected expense of $1,500. Mr. Smith decides to submit a request for an advance based on the anticipated wage load transaction from the employer 110, for $1,500. The request further specifies a repayment plan including five payments of $300 per anticipated wage load transaction. In submitting the request, Mr. Smith also agrees to a $25 service fee and to pay 2.5% interest on the outstanding balance, to be paid per debit from the prepaid payment account (thereby increasing the $300 debit per wage load by the 2.5% amount).

In turn in the method 300, the risk engine 118 receives the request for advance, at 302, from the employee 114.

Next, the risk engine 118 confirms, at 304, the employment status of the employee 114. This may include submitting an inquiry to the employer 110, via a defined means, from which a response is received confirming, or not, the current employment status of the employee 114. Alternatively, the employer 110 may maintain a current employee data structure, which is appended, by the employer 110 and/or the risk engine 118, to the data structure 120 at one or more regular or irregular intervals. Then, to confirm the employment status of the employee 114, the risk engine 118 searches for the employee's name in the current employee data structure, in the data structure 120. Because, in the John Smith example, Mr. Smith is still an employee of the employer 110, his name is included in the data structure 120 (in association with the employee 114) and his employment status is thus confirmed by the risk engine 118. Conversely, if the confirmation of employment status fails (e.g., if Mr. Smith's name was not in the data structure 120, etc.), the risk engine 118 declines the request and transmits a notification declining the request to the employee 114, at 306 (described more below).

It should be appreciated that one or more other operations and/or sequences of events (e.g., other than submitting an inquiry to the employer 110 or searching in a listing of employees, etc.) may be initiated and/or facilitated by the risk engine 118 to confirm the employment status of the employee 114, in response to the request for the advance. For example, the risk engine 118 may alternatively access publically available records indicating employment status of the employee 114, or other records (e.g., tax records, etc.).

Once the employment of the employee 114 with the employer 110 is confirmed (at 304), the risk engine 118 determines, at 308, whether to approve or decline the request for the wage advance based on a variety of data included in the data structure 120, and potentially based on other data. More generally, the risk engine 118 may employ any one or more of the individual inquires and/or challenges outlined above and/or below in making such determination. For example, for each inquiry/challenge, a data model may be employed in association with a threshold or multiple thresholds, by which the inquiry/challenge is determined to be in favor of approval or decline. The results may then be aggregated (either before or after comparison to the threshold(s)) to make an ultimate decision regarding the advance.

In some embodiments, as described above, a multivariate regression, scorecard, etc. may be used by the risk engine 118 to combine different methods/models/factors of predicting probability-of-default by the employee 114, exposure at default, etc. In connection therewith, particular weightings may be placed on various ones of the different methods/models/factors to produce a score forecasting likelihood of default and/or exposure at default, given a requested amount for a wage advance and a proposed repayment scheme. The resulting score may then be compared to a defined threshold, to determine whether to approve or decline the employee's wage advance request (at 308).

Alternatively, various individual methods/models/factors may be considered in association with their corresponding thresholds, with the resulting outcomes of each then being combined to determine whether to approve or decline the wage advance request (at 308) (or whether to suggest a different wage advance). As an example, the determination for approving the wage advance for John Smith (for the $1,500 wage advance and based on the proposed repayment scenario) may require a minimum FICO score of 620, no bankruptcies in the past ten years, a minimum employment of one year, no employer reports of performance improvement plans or reprimands, no outstanding advances with the issuer 108, no more than two prior advances in the past twelve months, and no more than 2% of the spend for his prepaid payment account being at casinos (e.g., at merchants having MCC 7801). Here, if all of the various thresholds (for all of the various factors/models included in this model) are satisfied, the risk engine 118 (and/or the issuer 108) will approve the request for the wage advance. However, if one or more of the thresholds are not satisfied, the risk engine 118 (and/or the issuer 108) may either (depending on which of the thresholds are not satisfied, and potentially by how much they are not satisfied) offer an alternative wage advance having a lower amount with a potentially different repayment plan (and thereby potentially having different thresholds for one or more of the above factors), sell the wage advance opportunity to a third-party provider that will then shoulder any risk associated with the wage advance, or decline the wage advance request.

In addition, the risk engine 118 may also, or alternatively, consider (at 308) one or more of the following methods/models/factors, either alone or in combination with the above, in determining whether to approve or decline the employee's request for the wage advance.

For example, the risk engine 118 may determine (via the data structure 120) whether the rate of job loss at the employer 110 (and job loss for the title and/or salary level for the employee 114), and potentially, at the specific site of the employee's employment, satisfies a threshold. In particular, in the example involving Mr. Smith, Mr. Smith is employed at the employer 110. And, in connection therewith, the risk engine 118 may access the data structure 120 and initially find that the employer 110 employs 10,000 people across four different sites (with 2,500 employees at each site), with an average rate of job loss for the employer 110 of 3.1% per month (ranging from 1.1% per month to 4.8% per month depending on the employer site). The risk engine 118 may also identify a specific site of the employer 110 at which Mr. Smith is employed, and determine that the rate of job loss at the site is 2.7% per month. The risk engine 118 may then further identify a threshold to be used of 3.0% per month, based on a job loss data model. As such, in this example, the rate of job loss at the particular site of the employer 110 at which Mr. Smith is employed is below the 3.0% per month threshold imposed by the data model. As such, the rate of job loss for the employer 110, at Mr. Smith's site, weighs in favor of approval of the request for Mr. Smith (if included as a factor in the above example model). With that said, it should be appreciated that in addition to the rate of job loss, the risk engine 118 may also take into account the process for termination implemented by the employer 110 (e.g., a more rigid process for termination may be seen as favorable to approving the request (or may raise the threshold applied by the risk engine 118), where a less rigid, or quicker, process of termination may weigh against approval of the request).

As another example factor, the risk engine 118 may also (or alternatively) consider regional data relating to the employer 110. For example, if the employer 110 is located in the southwest part of the United States, the risk engine 118 may identify an economic status of the southwest and use the status in connection with a decision to approve or decline a request for a wage advance. As still another example factor, the risk engine 118 may also consider use of prepaid cards at the employer 110 by employees (e.g., is such use increasing, decreasing, constant, etc.). Thus, regarding Mr. Smith (and Mr. Smith's employer 110), if the southwest is experiencing a recession and the number of prepaid cards used by the employees at the employer 110 is in decline (particularly at Mr. Smith's level of pay), the risk engine 18 may consider these factors as weighing in favor of declining Mr. Smith's request for the wage advance.

As another example, the risk engine 118 may also (or alternatively) consider a length of employment of the employee 114 at the employer 110, as determined by a start date associated with the employee 114 or as determined more generally by a consecutive number of past load transactions to the employee's prepaid payment account. Regarding Mr. Smith, the risk engine 118 may determine that Mr. Smith has been employed by the employer 110 for eight years (based on a start date for Mr. Smith with the employer 110), and has one-hundred ten bi-weekly consecutive past load transactions to his prepaid payment account. The durations differ, here, because the employer 110 opted to pay out wages to Mr. Smith and others, via the prepaid payment accounts, only 4 years and three month ago. In this example, the risk engine 118 may then identify a threshold length of employment to be 2.5 years for this factor, based on employment length data model. Since the duration of Mr. Smith's employment with the employee exceeds the 2.5-year threshold, it weighs in favor of approval of the advance request for Mr. Smith (if included as a factor in the above example model). With that said, it should be appreciated that the threshold may be modeled in various different ways, and based on various different data. For example, the 2.5 year threshold employed above may be based on the amount of the advance requested by Mr. Smith (i.e., $1,500). Here, for a lesser amount, such as, for example, $150, the threshold for length of employment may be only six months.

As a further example, the risk engine 118 may consider a wage amount and/or a wage trajectory of the employee 114 in connection with determining whether to approve or decline the advance request. The wage amount may be associated with a threshold specific to a region, employer site, employee title and/or responsibilities, etc. In at least one embodiment, the threshold is based on the advance amount requested by the employee and/or repayment plan proposed by the employee, whereby the threshold is selected to inhibit unreasonable repayment scenarios (e.g., it is unlikely that a $1,500 advance could be repaid based on two subsequent wage load transactions of $1,200, etc.). Here, business rules may be implemented by the risk engine 118 (e.g., via electronic request forms, etc.) to inhibit unacceptable wage advance amounts and/or ensure that payment plans submitted by users conform to the issuer's (or other party's) general risk standards (e.g., as a quality control feature, etc.). In addition, the wage amount may be compared to the relative pay level of the public for a region, for a job description, etc., whereby a wage amount at or above the public average weighs in favor of approving the request, while a wage amount below the public average weighs in favor of declining the request. The wage amount may also be considered in combination with other expected, projected, estimated, etc. payments and/or sources of income for the employee 114 or for which the employee 114 is responsible (e.g., rent, mortgage, child support, wages for other known individuals tied to the employee's household, etc.), which could either inhibit or help a suggested payment plan. The risk engine 118 may further consider gaps in payments and spend categories for the employee 114 relative to similarly situated employees here as well. Similarly, regarding the wage trajectory, a rise in the wages of the employee 114 over a six-month period, a one-year period, an 18-month period, a five-year period, or some other interval, is indicative of, at least, the employer's intention to preserve the employment of the employee 114. The wage trajectory may be quantified as a percent raise/decline over the interval, or a rate of changes, etc., versus one or more thresholds, as defined by a data model(s) or otherwise.

As still a further example, the risk engine 118 may consider (at 308) the historical transaction data of the employee 114, for example, based on MCCs included therein, in determining whether to approve or decline the advance request. In particular, the risk engine 118 may include a listing of particular MCCs that indicate acceptable spending habits (e.g., MCC 5411 for grocery stores and supermarkets, etc.), and a listing of particular MCCs that indicate unacceptable spending habits (e.g., MCC 5813 for bars, nightclubs and taverns, and MCC 7801 for casinos; etc.). In turn, the risk engine may identify (and sum) a number of transactions at merchants associated with unacceptable spending habits, and compare the resulting sum to a defined threshold (as provided by a data model(s) or otherwise). Regarding Mr. Smith, the risk engine 118 may access the transaction data for Mr. Smith's prepaid payment account for the last thirty days and identify multiple transactions at grocery stores and supermarkets (MCC 5411), two transactions at clothing stores (MCC 5691), one transaction a dry cleaner (MCC 7216), and one transaction at a casino (MCC 7801). In this example, the risk engine 118 may then identify a threshold for a number of unacceptable transactions to be five with a thirty-day interval, based on a transaction data model. And, since Mr. Smith had less than five such transactions, this factor weighs in favor of approval of the advance request for Mr. Smith. With that said, it should be appreciated that categories of merchants (e.g., MCCs, etc.) may be utilized in various other manners to suggest, to the risk engine 118, to approve or decline requests for advances. In addition, other aspects of transaction data, such as, for example, transaction times (e.g., multiple transactions at 2:00 AM, etc.), may be used by the risk engine 118 to determine whether to approve or decline requests for advances.

As another example, the risk engine 118 may consider (at 308) a number of requests for advances in a particular interval received from the employee 114. The risk engine 118 may then employ one or more thresholds, based on one or more intervals, as defined by data model(s) or otherwise, to determine if the frequency of the requests for the advances should weigh for or against approval of the request for the advance. It should be appreciated, as indicated above, that the advance amount included in the request and/or a time interval for the request may also be used to alter and/or select the threshold used by the risk engine 118 regarding the number of requests for advances previously made by the employee 114.

Moreover, in various embodiments, in connection with approving or declining the request for the advance submitted by the employee 114 (at 308), the risk engine 118 further requests, from one or more services providers (not shown), a credit score for the employee 114, such as, for example, a FICO score, etc. Like above, the risk engine 118 may employ one or more thresholds, as defined by appropriate data model(s) or otherwise, to determine whether the employee's credit score weighs in favor or against approving the request for the advance. In at least one embodiment, the risk engine 118 employs a service provider to provide such an indication, which may be positive or negative, for approval of the request for the advance. The service provider, then, may employ its own threshold and/or data model, and rely on the credit score of the employee 114 and/or any of the other data included above, in determining whether or not to approve the employee's request. The service provide then transmits the result(s) to the risk engine 118 for subsequent use (at 308).

With continued reference to FIG. 3, based on all, or part or various combinations, of the above, the risk engine 118 then determines whether to approve or decline the request for the advance, as received from the employee 114. If the risk engine 118 declines the request, the risk engine 118 transmits a corresponding notification to the employee 114 declining the request, at 306. The notification may be transmitted to the employee 114, by the risk engine 118, via the same means through which the request was received, including, for example, the application at the employee's communication device 116, a website, a telephone call, an SMS message, or otherwise. In addition, in some embodiments when the risk engine 118 declines the request, the risk engine 118 may include an offer in the communication to the employee 114 for an alternative wage advance. The alternative wage advance may include a different repayment plan and/or a lower wage advance amount than initially requested by the employee 114. The alternative wage advance may be based on the models/factors above, and may provide more acceptable terms to the issuer 108, the payment network 106, and/or the employer 110 for the advance.

However, if the risk engine 118 approves the request for the advance, the risk engine 118 transmits, at 310, a notification to the employee 114 indicative of the approval (in the same manner as described above at 306). In addition, the risk engine 118 notifies, at 312, the issuer 108 of the approved request for the advance (i.e., the advance that has been extended), whereby the issuer 108 is notified and/or instructed to permit the balance of the employee's prepaid payment account to go "negative," when the employee 114 makes a purchase consistent with the advance requested (where allowing the prepaid account to go "negative" generally indicates some form of credit facility being attached to the prepaid payment account, and where the credit facility is provided by the issuer 108 or by a third-party credit provider). In this manner, the risk engine 118 causes the issuer 108 to tolerate a negative balance for the prepaid payment account (when the credit facility attached to the account is provided by the issuer 108). It should be appreciated that such a notification and/or instruction may be omitted when the risk engine is incorporated in the issuer 108, whereby causing the prepaid payment account to tolerate the negative balance includes imposing at least one rule and/or permission for the negative balance when a transaction is being authorized.

After the approval of the advance, the employee 114 may use the advance, or not use the advance, as specified in the request for the wage advance (e.g., as requested by the employee 114, etc.) and/or as permitted by the approval of the advance request (e.g., as specified by a business rule from the issuer 108, etc.). In connection therewith, the wage advance may be available to the employee 114 for a specified period, for a period up to the next wage load transaction for the employee 114, or for a period beyond the next wage load transaction for the employee 114 (however, here, the risk assessment for the wage load may be refreshed following the subsequent wage load transaction).

In addition, in some embodiments, the wage advance, when approved by the risk engine 118, may be limited (or restricted) to use with particular merchants (e.g., specific merchants, merchants having particular MCCs, etc.). Here, upon initially submitting the request for the wage advance, the employee 114 may be required to specify a use for the advance. The risk engine 118 may then capture the desired use from the request and, based thereon, implement a restriction on where the employee 114 can spend the wage advance. In so doing, the wage advance may be maintained separate from other funds in the employee's prepaid payment account, and the risk engine 118 may then isolate an MCC, for example, for merchants at which the wage advance may be utilized. Regarding John Smith from the above example, if his wage advance is approved by the risk engine 118 (for the refrigerator), the risk engine 118 may separate the wage advance from other funds in the prepaid payment account for Mr. Smith, and then isolate merchants having MCC 5722 (household appliance merchants) and only allow the wage advance to be used at such isolated merchants.

At some later time in the method 300, the employer 110 directs a wage load transaction to the prepaid payment account for the employee 114 (as part of his/her wages). In turn, when the wage advance was used by the employee 114, and the employee's prepaid account includes a negative balance (again, where the negative balance may literally show as a negative balance indicating a credit facility is attached to the prepaid payment account, or may represent a load to the prepaid payment account by the issuer 108 or a third-party provider of the advance (i.e., indicating a load to the account other than the wage load from the employer 110)), the issuer 108 detects the new load transaction, at 314, and debits an amount from the load transaction and/or from the employee's prepaid payment account (to repay the advance in accordance with the specified prepayment plan). Specifically, for example, the risk engine 118 maintains a ledger total for the employee's prepaid payment account, which includes the negative balance (i.e., the amount advanced), any fees (including services fees, interest, etc.), etc. Then, at 316, the risk engine 118 debits a portion of the ledger total, which may be a portion defined in a repayment plan for the advance, or may include the entire ledger total, in connection with repaying the advance.

When the amount of the debit is less than the ledger total (i.e., the employee still has a balance due on the advance), the risk engine 118 repeats the detection (at 314) for the next wage load transaction and the debit (at 316) of an amount from the prepaid payment account. The risk engine 118 repeats these operations until the ledger total (i.e., the advance) is paid. In the John Smith example, the risk engine 118 debits $300 plus fees from the next one of the wage load transactions to his prepaid payment account, and then debts $300 plus fees from the next one of the wage load transactions, and so on, until the five required debits are made from the account for the $1,500 advance (and the associated fees).

In various implementations of the method 300, the risk engine 118 may transmit a notification to the employee 114, and/or otherwise provide notifications of the ledger total and/or debits, following each transaction.

Again, while the above is described with reference to employees, it should be appreciated that the systems and methods herein are not so limited, and instead may be applied to any other circumstances in which, for example, a user associated with a prepaid payment account receives wages or other load transactions, from a source, at one or more regular or irregular intervals.

In view of the above, the systems and methods herein provide for the expansion of credit services to prepaid payment accounts, based on anticipated load transactions to the prepaid payment accounts. In particular, when a source provides a load transaction to a prepaid payment account for a user (e.g., an employee, etc.) for a particular value, the user may be faced with one or more scenarios in which additional funds are required. As part of the present disclosure, such additional funds may be available to the user via an advance based on anticipated future load transactions to the user's prepaid payment account. The system and methods herein permit the advance to be approved, after consideration of certain data, which may include some or all the data referenced above, to thereby limit the risk associated with the advance. The advance is received directly through the prepaid payment account, in the form of a permitted negative balance. In this manner, an efficient, risk controlled credit service is available to the user, thereby providing a flexible prepaid payment account capable of accommodating various needs of the user.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transforms a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by (a) receiving an advance request, from a user, for a prepaid account, the prepaid account associated with anticipated load transactions associated with the user to which the prepaid account is associated, the advance request including an advance amount; (b) determining whether to approve the advance request based on the anticipated load transaction and at least one metric associated with user; (c) causing the prepaid account to reflect the advance amount when the advance request is approved; (d) detecting a next one of the anticipated load transactions; (e) debiting at least a portion of the advance amount from the prepaid account substantially at a time when the next one of the anticipated load transactions is available in the prepaid account; and (f) declining the advance request, when the user is no longer employed with an employer associated with the multiple load transactions, whereby the prepaid account is not permitted to tolerate a negative balance.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "coupled to," "associated with," "included with," or "in communication with" another element or layer, it may be directly on, engaged, connected or coupled to, associated with, or in communication with the other element or layer, or intervening elements or layers may be present. As used herein, the term "and/or" includes any and all combinations of one or more of the associated listed items.

In addition, as used herein, a product may include a service, a good, etc.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in extending credit to prepaid accounts, the method comprising:
    capturing, by an engine computing device, at regular intervals, a credit score for a user;
    storing, by the engine computing device, the captured credit score(s) in a data structure coupled to the engine computing device;
    receiving, by the engine computing device, an advance request, from a user employed by an employer, for a prepaid account, the prepaid account associated with at least one anticipated wage load transaction from the employer, the at least one anticipated wage load transaction associated with the user to which the prepaid account is associated, the advance request including an identification of the user, an identification of the employer, an advance amount, a proposed repayment plan, and a category of a merchant at which the advance amount is to be spent;
    in response to the advance request, accessing, by the engine computing device, the data structure, the data structure including a data model, employment histories for multiple employees employed by the employer, the captured credit score(s) for the user, and an average job loss at the employer of the multiple employees, the multiple employees including the user, wherein the data model includes a multivariate regression model indicative of a probability of default;
    confirming, by the engine computing device, employment of the user with the employer based on the identification of the user and the identification of the employer;
    generating a score for the advance request using the multivariate regression model and based on at least: the advance amount, the proposed repayment plan, the at least one anticipated wage load transaction, the average rate of job loss at the employer, a most recent credit score of the captured credit score(s) for the user, and the confirmed employment of the user with the employer;
    determining to approve the advance request based on the score satisfying a defined threshold; and
    in response to the determined approval of the advance request, instructing, by the engine computing device, an issuer associated with the prepaid account to permit a negative balance for the prepaid account up to the advance amount for a purchase at a merchant included in a category consistent with the category of merchant included in the advance request.

2. The computer-implemented method of claim 1, further comprising:
    detecting, by an issuer computing device associated with the issuer, a next one of the anticipated wage load transactions; and
    debiting, by the issuer computing device, at least a portion of the negative balance from the prepaid account substantially at a time when the next one of the anticipated wage load transactions is available in the prepaid account.

3. The computer-implemented method of claim 1, wherein generating the score is further based on a category of merchants included in historical transaction data associated with the prepaid account.

4. The computer-implemented method of claim 1, wherein generating the score is further based on a comparison of a length of employment of the user with the employer to an associated threshold.

5. The computer-implemented method of claim 1, wherein the employer includes multiple sites;
   wherein the user is employed at one of the multiple sites; and
   wherein the average rate of job loss in the data structure is a rate of job loss specific to the one of the multiple sites at which the user is employed.

6. The computer-implemented method of claim 1, further comprising monitoring the negative balance of the prepaid account;
   maintaining, by an issuer computing device, a ledger total associated with the prepaid account, the ledger total including the negative balance for a defined interval and at least one fee associated with the negative balance; and
   debiting, by the issuer computing device, the ledger total from the prepaid account upon posting of one of the anticipated wage load transactions.

7. The computer-implemented method of claim 1, wherein generating the score is further based on a frequency of advance requests received from the user.

8. The computer-implemented method of claim 1, further comprising transmitting a notification to the user indicating approval of the advance request.

9. The computer-implemented method of claim 1, wherein confirming employment of the user with the employer includes confirming, in the data structure, employment of the user with the employer based on the identification of the user and the identification of the employer.

10. A system for use in extending credit to prepaid accounts, the system comprising:
    an engine computing device configured to:
        capture a credit score for a user at one or more intervals;
        store the captured credit score(s) in a data structure in memory coupled to the engine computing device;
        receive an advance request, from a user employed by an employer, for a prepaid account, the prepaid account associated with at least one anticipated wage load transaction from the employer, the at least one anticipated wage load transaction associated with the user to which the prepaid account is associated, the advance request including an identification of the user, an identification of the employer, an advance amount, a proposed repayment plan, and a category of a merchant at which the advance amount is to be spent;
        access the data structure in response to the advance request, the data structure including a data model, employment histories for multiple employees employed by the employer, the captured credit score(s), and an average job loss at the employer of the multiple employees, the multiple employees including the user, wherein the data model includes a multivariate regression model indicative of a probability of default;
        confirm employment of the user with the employer based on the identification of the user and the identification of the employer;
        generate a score for the advance request using the multivariate regression model and based on at least: the advance amount, the proposed repayment plan, the at least one anticipated wage load transaction, the average rate of job loss at the employer, a most recent credit score of the captured credit score(s) for the user, and the confirmed employment of the user with the employer;
        determine whether to approve the advance request based on the score satisfying a defined threshold; and
        in response to the determined approval of the advance request, instruct an issuer associated with the prepaid account to permit a negative balance for the prepaid account up to the advance amount for a purchase at a merchant included in a category consistent with the category of merchant included in the advance request.

11. The system of claim 10, wherein the engine computing device is configured to generate the score further based on a category of merchants included in historical transaction data associated with the prepaid account.

12. The system of claim 10, wherein the engine computing device is configured to generate the score further based on a comparison of a length of employment of the user with the employer to an associated threshold.

13. The system of claim 10, wherein the employer includes multiple sites;
    wherein the user is employed at one of the multiple sites; and
    wherein the average rate of job loss in the data structure is a rate of job loss specific to the one of the multiple sites at which the user is employed.

14. The system of claim 10, wherein the engine computing device is configured to generate the score further based on a frequency of advance requests received from the user.

15. The system of claim 10, wherein the engine computing device is further configured to transmit a notification to the user indicating approval of the advance request.

* * * * *